United States Patent [19]

Nakashima et al.

[11] 3,927,331

[45] Dec. 16, 1975

[54] SIGNAL PHASE DETECTOR

[75] Inventors: Akio Nakashima; Yoshihiro Arakawa, both of Yokohama, Japan

[73] Assignee: Hitachi, Ltd., Japan

[22] Filed: May 3, 1974

[21] Appl. No.: 466,852

[30] Foreign Application Priority Data

May 5, 1973 Japan .............................. 48-50067

[52] U.S. Cl. ............... 307/232; 328/133; 330/30 D

[51] Int. Cl.$^2$ ........................................ H03K 5/20

[58] Field of Search .................. 330/30 D; 307/232; 328/133, 134

[56] References Cited

UNITED STATES PATENTS

| | | | |
|---|---|---|---|
| 3,512,096 | 5/1970 | Nagata et al. | 330/30 D |
| 3,757,138 | 9/1973 | Bhatia et al. | 330/30 D |
| 3,806,632 | 4/1974 | Okada | 307/232 X |

*Primary Examiner*—Nathan Kaufman
*Attorney, Agent, or Firm*—Craig & Antonelli

[57] ABSTRACT

The signal phase detector according to this invention comprises a differential amplifier with a couple of transistors, a first transistor inserted between the emitters of the couple of transistors and a first point of reference potential, a second transistor inserted between the output terminal of one difference the transistors of the differential amplifier and a second point of reference potential, a third transistor connected to the second point of reference potential, and a fourth transistor connected in series with the third transistor and between the output terminal of the third transistor and the output terminal of the other of the transistors of the differential amplifier. A reference signal is applied to the base of the first transistor, while a signal to be compared is applied to the base of one of the transistors of the differential amplifier, so that an output signal corresponding to the phase differential between the two signals is obtained from the output terminal of the other of the transistors of the differential amplifier.

2 Claims, 6 Drawing Figures

SIGNAL PHASE DETECTOR

FIELD OF THE INVENTION

This invention relates to a signal phase detecting circuit employing transistors, or more in particular to a phase detecting circuit of differential pulse gate type. This invention is suitably used among others for the horizontal automatic frequency control circuit of the television receiver.

DESCRIPTION OF THE PRIOR ART

Figures 1, 2:
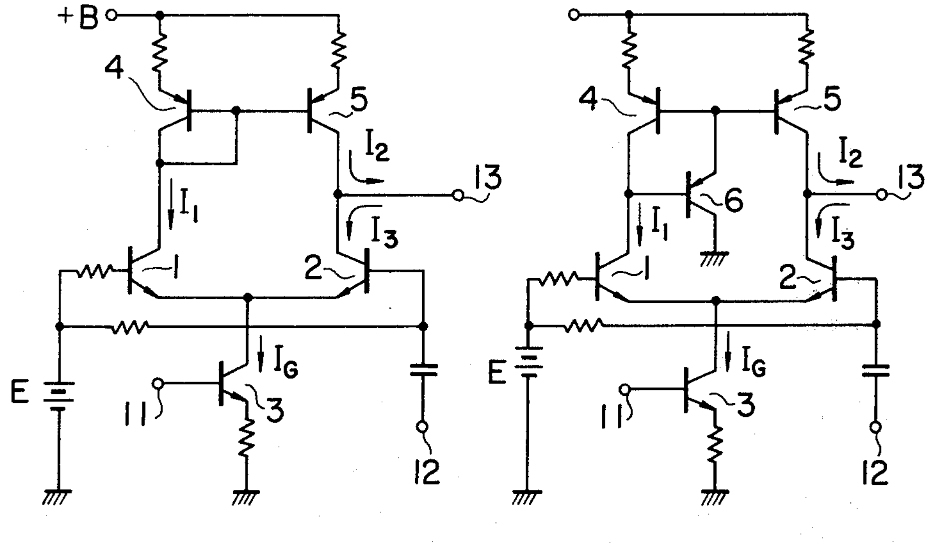
FIG. 1 PRIOR ART, FIG. 2 PRIOR ART
FIGS. 1 and 2 are circuit diagrams showing conventional phase detecting circuits.

Referring to FIG. 1 showing the conventional phase detecting circuit of differential pulse gate type, reference numerals 1 and 2 shown a differential amplifier, numeral 3 a gate transistor, and numerals 4 and 5 current transforming transistors for obtaining collector current $I_2$ of the same magnitude as the collector current $I_1$ of transistor 1.

In this circuit, when a gating synchronizing signal, that is, a reference signal and a saw-tooth wave signal are applied respectively to the input terminals 11 and 12, a signal representing the phase difference between the gating synchronizing signal and the saw-tooth wave signal is obtained at the output terminal 13.

Figure 3:
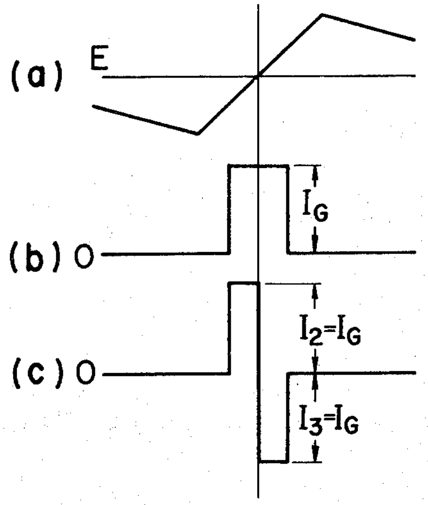
FIGS. 3, 4 and 5 are diagrams showing the relations between input and output signal waveforms for explaining the conventional phase detecting circuits of FIGS. 1 and 2.

Assume that the transistors 1 to 5 shown in FIG. 1 operate ideally, that is, the current amplification factor of each of the transistors 1 to 5 is unity. An output current without any DC portion is produced at the output terminal 13 when the frequency and phase of the freely oscillating signal of the automatic frequency control circuit including the phase detecting circuit are identical with the frequency and phase of the synchronizing signal respectively. In other words, by applying the gating synchronizing signal as shown in (b) of FIG. 3 to the input terminal 11 and the saw-tooth wave signal for comparison as shown in (a) of FIG. 3 to the input terminal 12, an output current without any DC portion as shown in (c) of FIG. 3 is obtained.

If the phase detecting circuit of FIG. 1 is formed as an integrated circuit, the collector current $I_2$ of the transistor 5 becomes smaller than the collector current $I_G$ of the transistor 3 as the DC amplification factor of each of the transistors 1 to 5 is very low. Since the DC amplification factor of the transistors 4 and 5 is small, the base current $I_b$ of the transistors 4 and 5 become not negligible, so that $I_1 = 2I_b + I_c = I_G$ but $I_2 = I_c < I_G$, where $I_c$ is the collector current of transistors 4 and 5. Also, let the current amplification factor of transistors 4 and 5 be $\alpha$. Then, $$\frac{I_2}{I_G} = \frac{\alpha}{2-\alpha} \qquad (1)$$

Therefore, $$\frac{I_2}{I_G} = 0.82 \qquad (2)$$

The process of obtaining the equation (1) above will not be described as it is easily reached by setting up an equation with the emitter current of the transistors 4 and 5 as 1.

Figure 4:
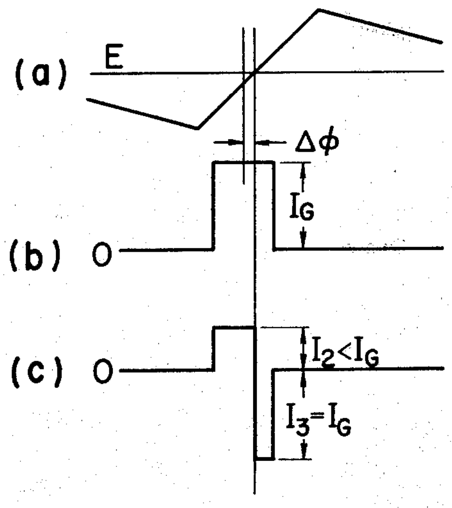

As a result, although the frequency of the gating synchronizing signal of the saw-tooth wave signal for comparison undergoes no change, the phase of the saw-tooth wave signal is locked with a phase difference of $\Delta\phi$ as against the phase of the gating synchronizing signal as shown in FIG. 4, so that the signal as shown in (c) is produced at the output terminal 13.

The circuit of FIG. 2 showing a known improvement in the phase detecting circuit of FIG. 1 is different from the circuit of FIG. 1 in that in the circuit of FIG. 2 the short-circuiting path between the base of the transistor 4 and the collector thereof is replaced by another transistor 6 inserted therebetween thereby to compensate for the reduction in current amplification factor.

In the circuit of FIG. 2, if the cut-off current of transistor 6 is disregarded, $$\frac{I_2}{I_G} = \frac{\alpha}{2-3\alpha+2\alpha^2} \qquad (3)$$

where if $\alpha$ is 0.9, $$\frac{I_2}{I_G} = 0.98 \approx 1.0 \qquad (4)$$

Figure 5:
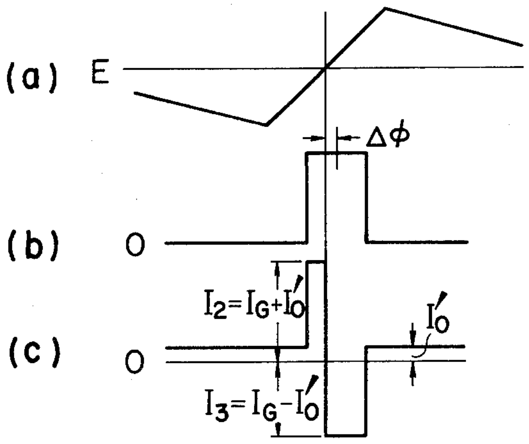

Thus the circuit of FIG. 1 is improved. In spite of this, the circuit of FIG. 2 is such that the phase difference $\Delta\phi$ occurs as shown in FIG. 5 due to the collector cut-off current. In other words, the collector cut-off current of the transistor 6 is increased $1/1\text{-}\alpha$ times by the transistor 5 to reach $I_O'$ as shown in (c) of FIG. 5 which flows in the circuit throughout the period, with the result that a large phase error occurs in spite of the small value of the current.

If such an error occurs in the phase detecting circuit (AFC circuit) used for the horizontal AFC circuit of the television receiver, it causes loss of part of picture information on the right or left side of the screen.

SUMMARY OF THE INVENTION

An object of the present invention is to provide a novel and useful phase detecting circuit.

Another object of the invention is to provide a phase detecting circuit in which the phase error due to the lack or shortage of the current amplification factor of transistors and cut-off current thereof is eliminated.

According to this invention, there is provided a phase detecting circuit comprising a differential amplifier with a couple of transistors, a first transistor inserted between a first point of reference potential and the emitters of the transistors of the differential amplifier, a second transistor inserted between the output terminal of one of the transistors of the differential amplifier and a second point of reference potential, a third transistor connected to the second point of reference potential, a fourth transistor inserted in series with the third transistor between the output terminal of the third transistor and the output terminal of the other of the transistors of the differential amplifier, means for supplying a reference signal to the base of the first transistor, means for applying a signal to be compared to the base of one of the transistors of the differential amplifier, and means for collecting an output signal from the output terminal of the other of the transistors of the differential amplifier.

The fourth transistor provided in the phase detecting circuit according to the present invention enables the lack of the current amplification factor of the third transistor to be compensated for. In addition, the third and fourth transistors do not amplify the collector cut-off current of the other transistors. Instead, only the smaller of the collector cut-off currents of the third and fourth transistors flows in the third and fourth transistors. This collector cut-off current is so small as to be negligible.

DESCRIPTION OF THE PREFERRED EMBODIMENTS

Figure 6:
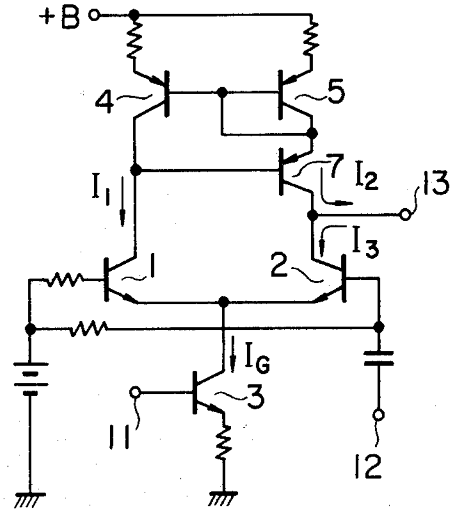
FIG. 6 is a diagram showing a phase detecting circuit embodying the present invention.

The phase detecting circuit according to the invention will be explained below with reference to FIG. 6, in which like component elements shown in FIG. 1 are affixed with like reference numerals and will not be described.

According to this invention, the bases of the current transforming transistors 4 and 5 are commonly connected to the collector of the transistor 5, and an additional transistor 7 is provided which has an emitter connected to the junction point between the base and collector of the transistor 5. The collector and base of the transistor 7 are connected to the output terminal 13 and the collector of the transistor 4 respectively.

By so doing, $I_2/I_G$ which has posed a problem in the circuit of FIG. 1 becomes $$\frac{I_2}{I_G} = \frac{(2-\alpha)\alpha}{2-2\alpha+\alpha^2} \quad (5)$$

If $\alpha$ is 0.9, $$\frac{I_2}{I_G} = 0.98 \approx 1.0 \quad (6)$$

Thus the complete improvement is achieved. As to the problem of collector cut-off current posed in the circuit of FIG. 2, only the smaller one of the collector cut-off currents in the transistors 5 and 7 flows through the transistors 5 and 7 and no collector cut-off current of the other transistors is produced at the output terminal 13 by being amplified by the transistors 5 and 7, so that the collector cut-off current appearing at the output terminal 13 is so small as to be negligible. As a result, the output current as shown in (c) of FIG. 2 is produced when the frequency and phase of the gating synchronizing signal are identical with those of the saw-tooth wave signal to be compared.

It will be understood from the above description that the present invention makes it possible to eliminate all the causes of the phase error occurring in the conventional circuits of FIGS. 1 and 2 at the same time. Therefore, by using the invention as a phase detecting circuit of the horizontal AFC circuit of the television receiver, lack of information in the picture is eliminated. The advantage of the phase detecting circuit according to the present invention is especially great when it is formed as an integrated circuit with small current amplification factor of the transistors included therein.

We claim:

1. A phase detecting circuit comprising a differential amplifier with a pair of transistors, a first transistor with its collector connected to the emitters of said pair of transistors and with its emitter connected to a first point of reference potential, a second transistor with its collector connected to the collector of one of the transistors of said differential amplifier and with its emitter connected to a second point of reference potential, a third transistor with its emitter connected to said second point of reference potential and with its base connected to the base of said second transistor, the base and collector of said third transistor being short-circuited, a fourth transistor with its emitter connected to the collector of said third transistor and with its base connected to the collector of said second transistor, the collector of said fourth transistor being connected to the collector of the other said transistors of said differential amplifier, means for supplying a reference signal to the base of said first transistor, means for applying a signal to be compared with said reference signal to the base of a selected one of the one and the other of said transistors of said differential amplifier, and means of collecting an output signal from the collector of the nonselected one of the one and the other of said transistors of said differential amplifier.

2. A phase detecting circuit according to claim 1, further comprising means for applying a bias voltage to the base of one of the one and the other of said transistors of said differential amplifier.

* * * * *